United States Patent
Shaffer

(10) Patent No.: US 6,629,061 B1
(45) Date of Patent: Sep. 30, 2003

(54) AUTOMATIC CONCEALMENT OF PRODUCT SERIALIZATION INFORMATION

(75) Inventor: Larry J Shaffer, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 151 days.

(21) Appl. No.: 09/629,791

(22) Filed: Jul. 31, 2000

(51) Int. Cl.[7] .............................................. G06F 13/00
(52) U.S. Cl. ........................ 702/188; 702/182; 713/200
(58) Field of Search .............................. 702/81, 82, 83, 702/84, 122, 187, 188; 713/200, 202, 193, 189, 191, 194, 201; 717/124; 340/5.8

(56) References Cited

U.S. PATENT DOCUMENTS

| | | | | |
|---|---|---|---|---|
| 4,456,790 A | * | 6/1984 | Soyack .................. 379/102.01 |
| 5,774,545 A | * | 6/1998 | Raghavachari .............. 713/189 |
| 5,796,750 A | * | 8/1998 | Lottridge et al. ........... 714/725 |
| 5,838,793 A | * | 11/1998 | Lewis ........................ 340/5.65 |
| 5,857,021 A | * | 1/1999 | Kataoka et al. ............... 705/54 |
| 5,892,906 A | * | 4/1999 | Chou et al. .................. 713/202 |
| 5,933,620 A | * | 8/1999 | Lee et al. ...................... 716/1 |
| 5,959,275 A | * | 9/1999 | Hughes et al. ............... 235/375 |
| 6,032,257 A | * | 2/2000 | Olarig et al. ................ 713/200 |
| 6,167,401 A | * | 12/2000 | Csipkes et al. ................ 707/10 |
| 6,219,230 B1 | * | 4/2001 | Cho ........................... 361/683 |
| 6,233,536 B1 | * | 5/2001 | Zale et al. ................... 702/188 |

FOREIGN PATENT DOCUMENTS

EP 1 006 447 A2 6/2000

OTHER PUBLICATIONS

European Search Report for European Patent Application No. 01304051.4.

* cited by examiner

Primary Examiner—Marc S. Hoff
Assistant Examiner—Jeffrey R West
(74) Attorney, Agent, or Firm—John C. Moran

(57) ABSTRACT

During the final testing of a printed circuit board, a test set inserts the actual serial number of a printed circuit board into one or more memory devices on the printed circuit board after reading the serial number from the printed circuit board. Further, the serial number is uniquely identified by the manufacturer in the manufacturer's database. The serial number is then transmitted to the manufacturer's database where it is stored and associated with the telecommunication switching system that the printed circuit board will be inserted into.

8 Claims, 4 Drawing Sheets

AUTOMATIC CONCEALMENT OF PRODUCT SERIALIZATION INFORMATION

TECHNICAL FIELD

This invention relates to protection of circuit identification information and more particularly, to an arrangement for protecting a serial number of a printed circuit board.

BACKGROUND OF THE INVENTION

A problem for companies who manufacture, sell, and service large electronic systems is to be able to identify on a customer site or at a repair facility individual printed circuit cards. Within the telecommunication industry, the cost of an individual printed circuit board is thousands of dollars. In addition, because of the global economy, a manufacturer may choose to sell the identical printed circuit board at a lower cost, in a first country than in a second country. The so-called gray market is the practice of taking cards that are sold in the first country and shipping them to the second country. From a contractual point of view, this practice is not allowed, however it is difficult to prevent unless individual cards can be identified with a unique serial number.

The second problem that manufacturers have with the more expensive and more complex cards is the necessity of being able to track individual cards for repair purposes. For example, most large system manufacturers maintain a data base that identifies each-card produced by that manufacturer by a unique serial number. This serial number is utilized to identify problems that have been occurring on the printed circuit board and also to be able to know what vintage a particular type of printed circuit board is. Finally, manufacturers also offer service contracts for the maintenance of their systems. A large customer may choose to have a maintenance contract on one system but not on another system. The problem that occurs is that if the customer detects that a printed circuit board has, failed in a system that does not have a maintenance contract, the customer may move the failed printed circuit board to the system that has the maintenance contract. Hence, even within a single country, it is necessary to be able to identify an individual printed circuit board to an individual system.

The prior art has attempted to address these problems in a variety of ways. First, is to place the serial number of the card in printable form on the printed circuit board using a barcode or a human readable number. The problem with this solution is that individuals simply manufacture their own labels. Manufacturers have also attempted to mold or laser reproduce serial numbers into the face plates of printed circuit boards or on the printed circuit boards themselves. These techniques suffer from cost and also in the case of the face plates individuals simply remove the face plates and move it to another printed circuit board. A final solution is to utilize unique integrated circuits that have a preset number. Such an integrated circuit is placed on the printed circuit board in a manner in which it can be read externally by a device. The problem with this solution is that these devices are easily identified on a printed circuit board and can be removed and placed on another printed circuit board. In addition, the number is determined by the manufacturer of the integrated circuit and does not directly correspond With the actual serial number of the printed circuit board. In addition, there is the cost associated with the purchase and the installation of a unique integrated circuit on a printed circuit board for the sole purpose of identifying the board.

One such device that has a pre-programmed identification number is the DS1990A manufactured by Dallas Semiconductor.

SUMMARY OF THE INVENTION

The foregoing problems are solved and a technical advance is achieved by allowing a test set during the final testing of a printed circuit board to insert the actual serial number of the printed circuit board into one or more, memory devices on the printed circuit board. Advantageously, the test set obtains the serial number of the printed circuit board by the utilization of scanner which scans the serial number from the barcode on the printed circuit board. Further, the barcode's serial number is uniquely identified by the manufacturer in the manufacturer's database. The test set inserts the serial information into one or more memory devices on the printed circuit board. Advantageously, the serial information is encrypted before being inserted into the memory devices. The serial number is then transmitted to the manufacturer's database where it is stored and associated with the telecommunication switching system that the printed circuit board will be inserted into. The central database in response to the serial information transmits operational information such as programs and data to the test set for insertion into the printed circuit board. After the printed circuit board has finished being tested on the test set, it is made operational in its assigned telecommunications switching system either at the manufacturer's location or in a field installation. During routine maintenance, a processor controlling the telecommunication switching system requests the serial number from the printed circuit board. A controller providing control of the printed circuit board decrypts the serial number and transmits it to the processor. The processor then transmits a request to the manufacturer's database to verify that the printed circuit board as identified by the serial number should be operational in this particular telecommunication switching system. This request can be made either by a direct telecommunication call or via the Internet. The manufacturer's database determines if the printed circuit board should or should not be operational in this particular telecommunication switching system. If the answer is yes, the card is allowed to remain operational. If the answer is no, the processor controlling the telecommunication switching system disables the printed circuit board and initiate a maintenance alarm. Advantageously, the checking to verify that the printed circuit board is operational in its assigned telecommunication switching system prevents the unauthorized use of the printed circuit board in other telecommunication switching systems.

These and other features and advantages of the invention will become apparent from the following description of the illustrative embodiments of the invention considered together with the drawing.

DETAILED DESCRIPTION

Figure 1:
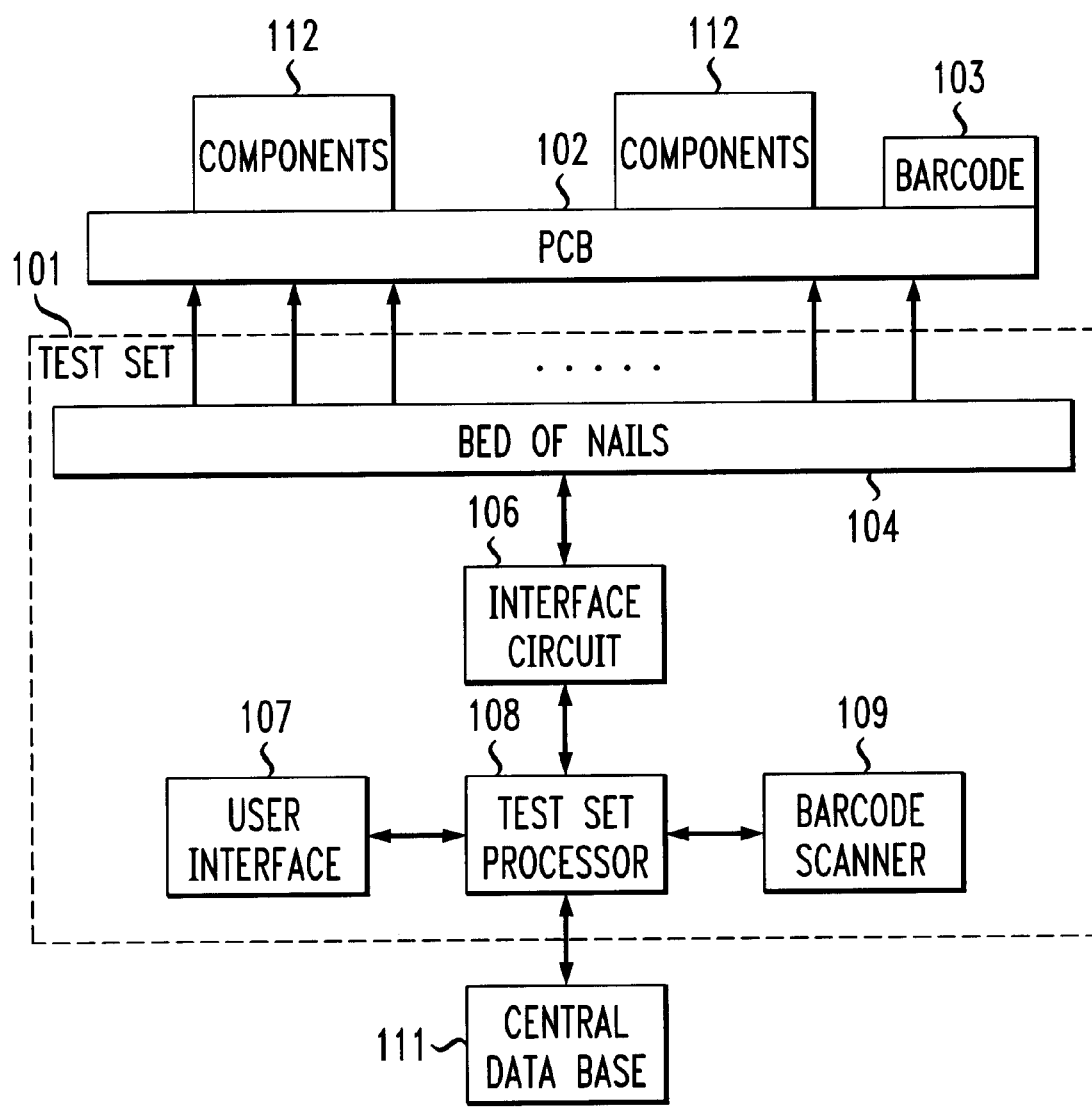
FIG. 1 illustrates in block diagram form, a system for implementing the invention during testing.

FIG. 1 illustrates the apparatus for implementing the invention. Test set 101 is of a type well known in the art. An example of such a test set is the HP3070. Test set 101 establishes electrical contact with a printed circuit board such as printed circuit board 102 via bed of nails 104. Bed of nails 104 has a plurality of small vertical electrical contact pins that establish electrical connections with various portions of printed circuit board 102. Test set 101 is controlled by test set processor 108. User interface 107 allows an operator of test set 101 to interface With test set processor 108. Test set processor 108 can receive and transmit signals to printed circuit board 102 via interface circuit 106 and bed of nails 104. Barcode scanner 109 is utilized to scan the barcodes on printed circuit boards. As is well known in the art, test set processor 108 can exchange data with central database 111.

Figure 2:
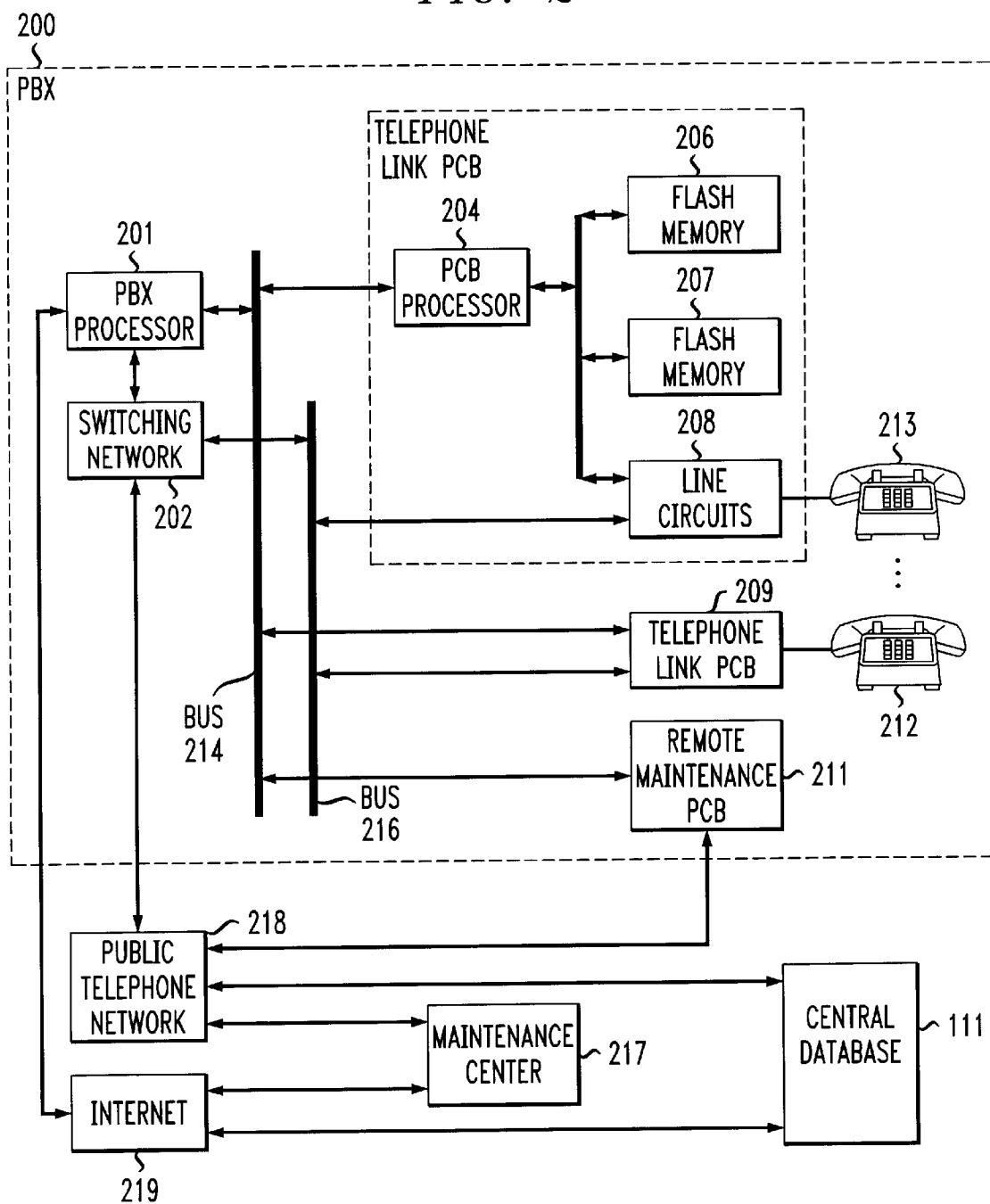
FIG. 2 illustrates, in block form, a system for implementing the invention during field use.

Printed circuit board 102 has a large number of components designated as components 112. As is illustrated in FIG. 2, components 112 includes flash memory 206, flash memory 207, line circuits 208 and printed circuit board processor 204. Not illustrated in FIG. 1, printed circuit board 102 has a connector of a well-known design that allows it to plug into a carrier within PBX 200 of FIG. 2.

Central database 111 maintains a database for all printed circuit boards being manufactured or that have been manufactured by a particular manufacturer, and in which PBX, a printed circuit board is allowed to be operational. Central database 111 also contains the programs and operational data that must be loaded in to flash memories 206 and 207. During the testing of printed circuit board 102, test set 101 requests the program and operational data from central database 111. Test set 101 then inserts this data into the appropriate flash memories and other devices. Next, test set processor 108 instructs the operator to utilize barcode scanner 109 to scan barcode 103 that is affixed to printed circuit board 102. Barcode 103 defines the unique serial number of printed circuit board 102 that defines various attributes of the board to the manufacturer. In response to the serial number, test processor 108 transmits this to central database 111 and programs it into flash memory 206 and 207. Since flash memories 206 and 207 are large memories each consisting of megabytes of information, these memories cannot be readily exchanged nor can an individual easily find the serial number. In addition, the serial number can be encoded using well-known techniques. Central database 111 then correlates printed circuit board 102 with the serial number. Finally, test processor 108 performs a full functional test of printed circuit board 102 to assure that printed circuit board 102 is properly functioning.

FIG. 2 illustrates an apparatus for implementing the invention in a field environment. PBXS 200 is providing telecommunication service for telephone sets 212 through 213. The telephone sets are connected to the switching network 202 via line circuits 208 through 209. In addition, line circuits 208 and 209 are connected to bus 214 and receive control information from PBX processor 201 via bus 214. PBX processor 201 provides the overall control for PBX 200. Remote maintenance printed circuit board 211 provides the remote maintenance capability on PBX 200 for maintenance center 217.

During normal operation, maintenance center 217 accesses remote maintenance printed circuit board 211 via Internet 219, PBX processor 201, and bus 214. As is well known in the art, PBX processor 201 may also have access to Internet 219 through other computers. In addition, upon the failure of PBX processor 201, maintenance center 217 accesses remote maintenance printed circuit board 211 via public telephone network 218. In addition, public telephone network 218 provides access to other telephones for telephone sets 212 through 213 via switching network 202. Maintenance center 217 obtains the serial numbers for the printed circuit boards in PBX 200 from central database 111 via Internet 219 or public telephone net 218. Periodically, maintenance center 217 requests via Internet 219 from PBX processor 201 the serial numbers of all printed circuit boards in PBX 200. In response to this request from maintenance center 217, PBX processor 201 obtains the serial number for each individual printed circuit board by performing the following operations with each printed circuit board. For example, PBX processor 201 requests from printed circuit board processor 204 the serial number for printed circuit board 102. Printed circuit board processor 204 accesses the locations where the serial number is stored in both flash memory 206 and 207. Printed circuit board processor 204 then transmits the serial number to PBX processor 201 which in turn relays it to maintenance center 217. Various encryption-methods can also be utilized to encrypt the serial numbers stored in flash memories 206 and 207.

Figure 3:
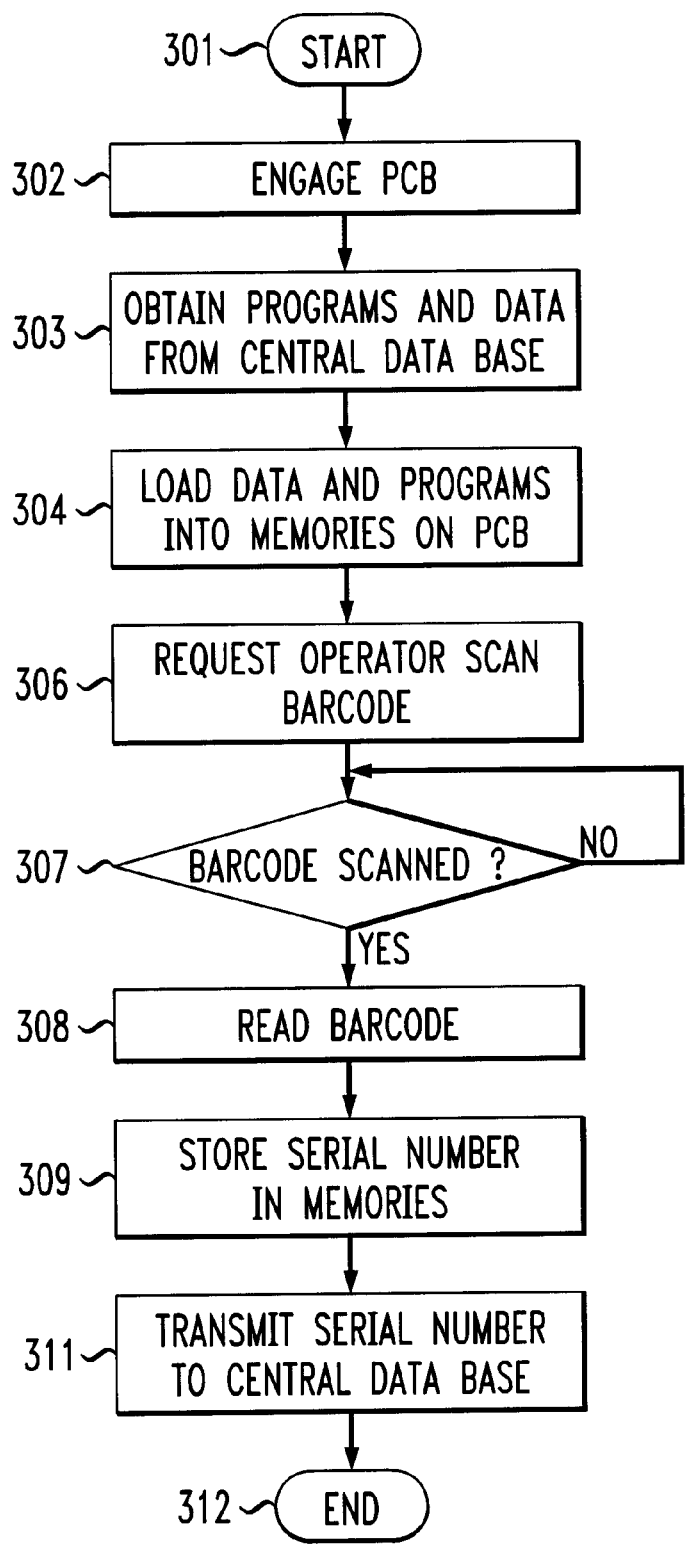
FIG. 3 illustrates, in flowchart form, the steps performed by a test set processor.

FIG. 3 illustrates, in flowchart form, the steps performed by test set processor 108. After the program is started by the operator from block 301, block 302 activates the mechanism that causes bed of nails 104 to make contact with printed circuit board 102. Block 303 then obtains the programs and data from central database 111, and block 304 loads the data and programs into the appropriate memories on printed circuit board 102. Block 306 requests that the operator of test set 101 use barcode scanner 109 to scan barcode 103 of printed circuit board 102. Decision block 307 waits until the operator has scanned the barcode before transferring control to block 308. The latter block reads the barcode from barcode scanner 101. Block 309 converts the barcode into the serial number of printed circuit board 102 and stores this in memories 206 and 207. The serial numbers may be encrypted or otherwise made unintelligible to those trying to obtain the serial number from memories 206 and 207 utilizing techniques well known to those skilled in the art. After the serial number has been stored on printed circuit board 102, the serial number is transmitted to central database 111 by block 311. The operation is now completed by execution of block 312. Note, as is well known in the art, test set 101 also performs the necessary diagnostics to establish that printed circuit board 102 is functioning properly.

Figure 4:
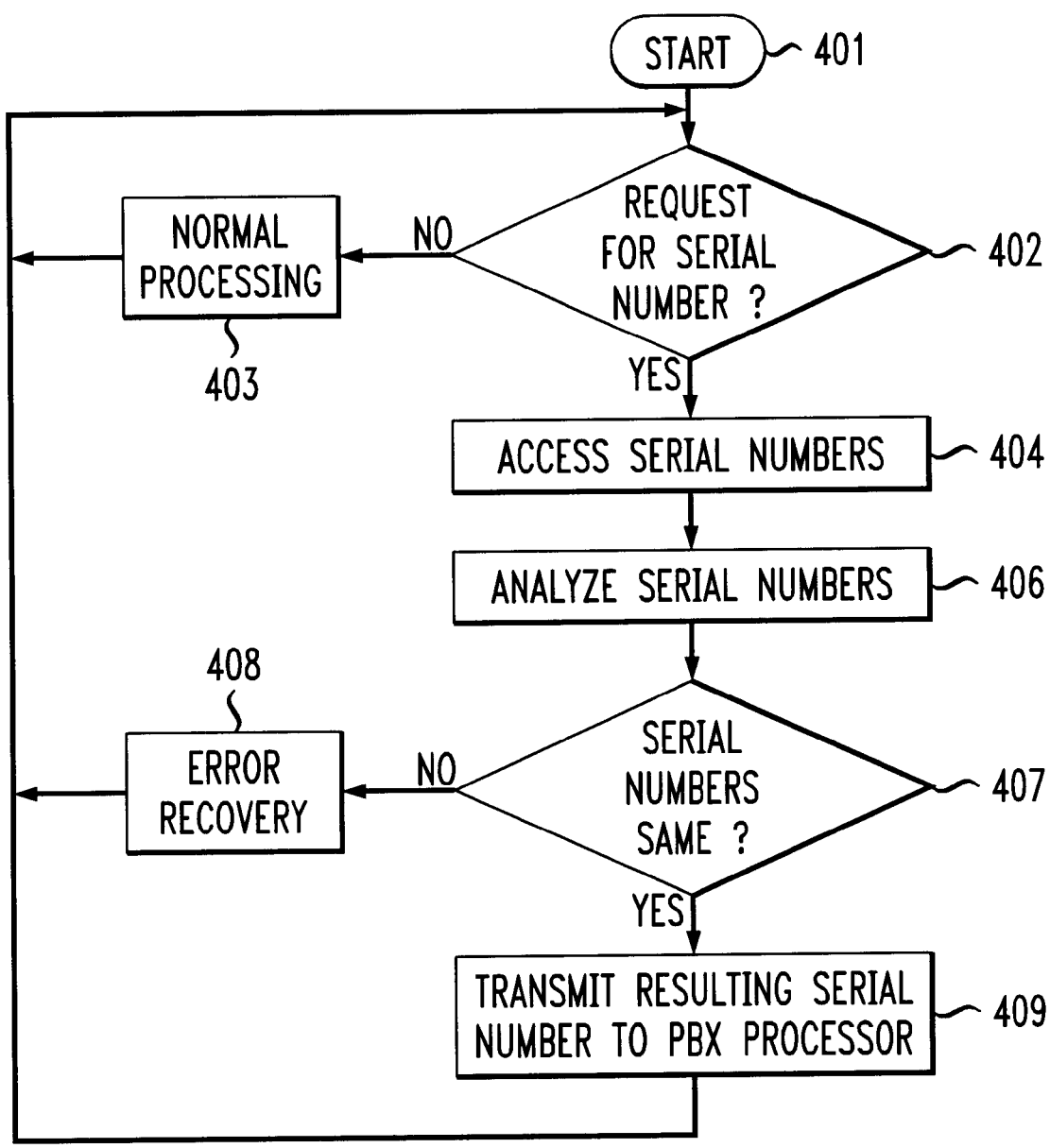
FIG. 4 illustrates, in flowchart form, the steps performed by printed circuit board processor.

FIG. 4 illustrates the operations performed by printed circuit board processor 204 of FIG. 2. Once started in block 401, decision block 402 waits for a request for the serial number stored in flash memories 206 and 207 from PBX processor 201. If a request is not received, control is transferred to block 403 which performs normal processing for the functions of printed circuit board 102. If a request for a serial number is received, decision block 402 transfers control to block 404 that accesses the serial numbers from memories 206 and 207. Block 406 then analyzes the serial numbers. Block 406 decrypts the serial numbers if they are encrypted or otherwise protected from casual scrutiny. Once the necessary operations have been performed to extract the serial numbers in their correct form, the serial numbers are compared to make sure that they are the same by decision block 407. If the answer is no, block 408 performs error recovery before transferring control back to decision block 402. This error recovery would include informing PBX processor 201 of the failure. In response, PBX processor 201 makes printed circuit board 102 non-operational and institutes a maintenance alarm. If the serial numbers are the same, decision block 407 transfers control to block 409 that transmits the resulting serial number to PBX processor 201 before transferring control back to decision block 402.

Of course, various changes and modifications to the illustrative embodiment described above will be apparent to those skilled in the art. Such changes and modifications can be made without departing from the spirit and scope of the invention and without diminishing its attendant advantages. It is therefore intended that such changes and modifications be covered by the following claims except insofar as limited by the prior art.

What is claimed is:

1. A method for protecting product serial information in a printed circuit board, comprising the steps of:

reading the serial information by a test set using a scanner during final test of the printed circuit board connected to the test set in a factory;

inserting the serial information into a plurality of memory devices on the printed circuit board by the test set;

transmitting the serial information by the test set to a central database;

storing the serial information by the central database;

transmitting operational information from the central database to the test set;

storing the operational information into the printed circuit board by the test set;

initializing an operational status of the printed circuit board in a telecommunication switching system in the field;

requesting the serial information from a controller on the printed circuit board by a processor controlling the telecommunication switching system in which the printed circuit board is operational in the field;

accessing each inserted serial information from each of the plurality of memory devices on the printed circuit by the controller;

comparing each accessed inserted serial Information with each other accessed inserted serial information;

transmitting one of the accessed inserted serial information to the processor by the controller upon the comparisons being successful;

requesting by the processor that the central data base verify that the printed circuit board as identified by the transmitted one of the accessed inserted serial information should be operational in the telecommunication switching system;

determining that the printed circuit board should not be operational in the telecommunication switching system by the central database;

transmitting the determination to the processor; and making the printed circuit board non-operational by the processor in the field in response to the determination by the central database if it is determined that the printed circuit board should not be operational in the telecommunication switching system then the printed circuit board should be made non-operational.

2. The method d of claim 1 wherein the step of inserting the serial information into the plurality of memories by the test set comprises the step of encrypting the serial information by a controller controlling the printed circuit board.

3. The method of claim 2 wherein the step of transmitting serial information to the processor by the printed circuit board comprises the step of decrypting the serial information by the controller controlling the printed circuit board.

4. The method of claim 3 further comprises the step of allowing the printed circuit board to remain operational upon the determination by the central data base indicating that the printed circuit board should be operational in the telecommunication switching system.

5. An apparatus for performing the method of claim 1.

6. An apparatus for performing the method of claim 2.

7. An apparatus for performing the method of claim 3.

8. An apparatus for performing the method of claim 4.

* * * * *